Nov. 12, 1929.    W. P. WILSON    1,735,028
DATA COMPUTER
Filed Aug. 22, 1927    4 Sheets-Sheet 4
Fig-5.    Fig-8.
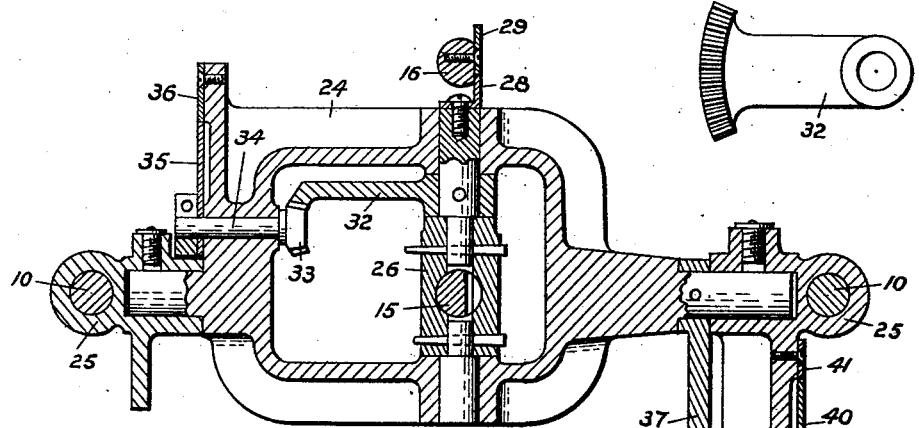
Fig-6.
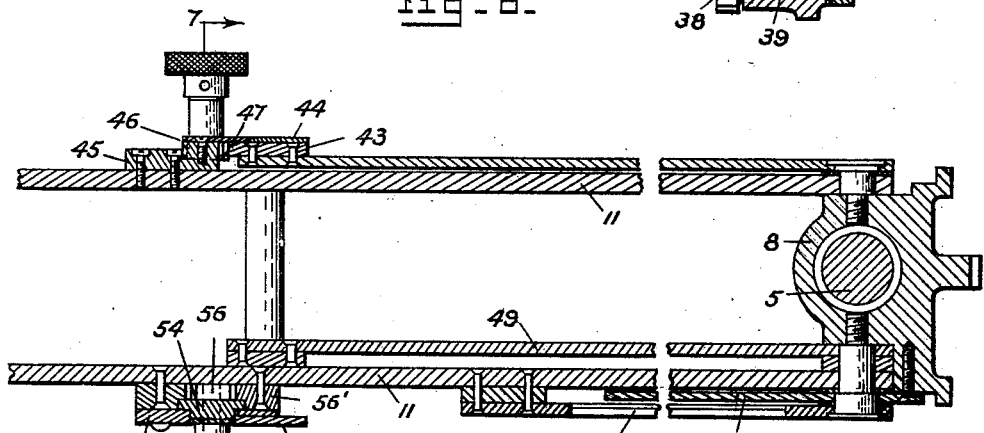
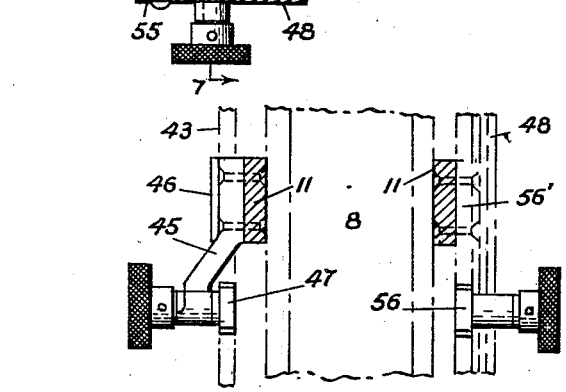
Fig-7.
Inventor
W. P. Wilson
By W. M. Roach
Attorney Patented Nov. 12, 1929

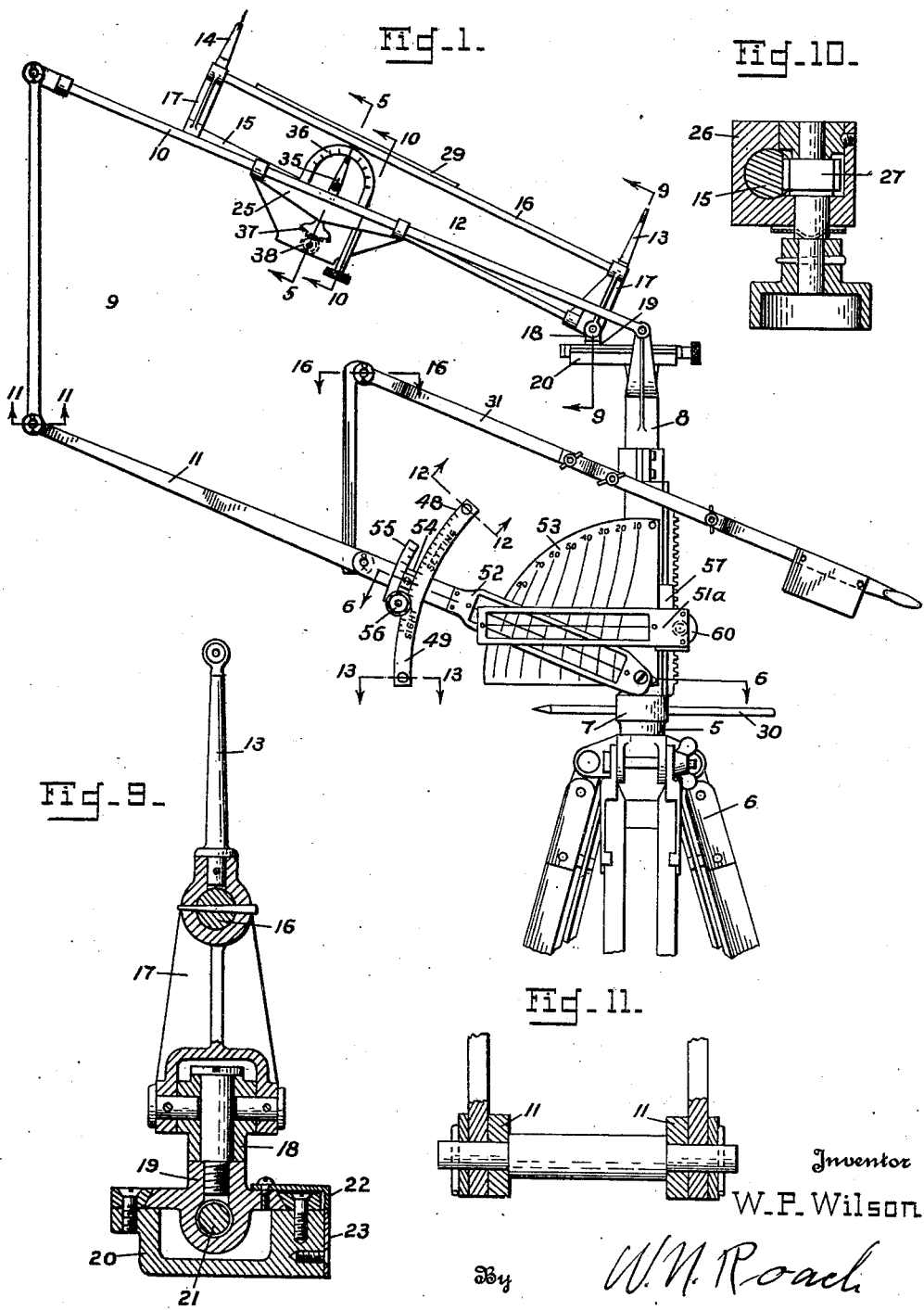

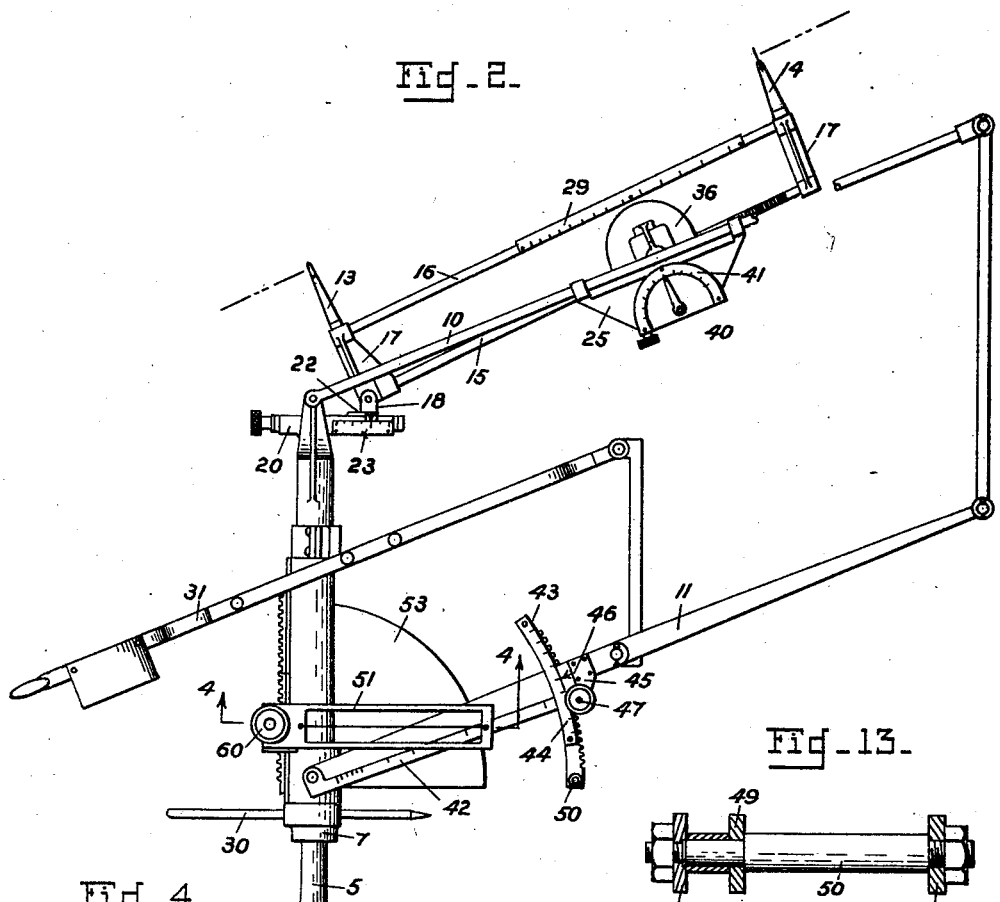

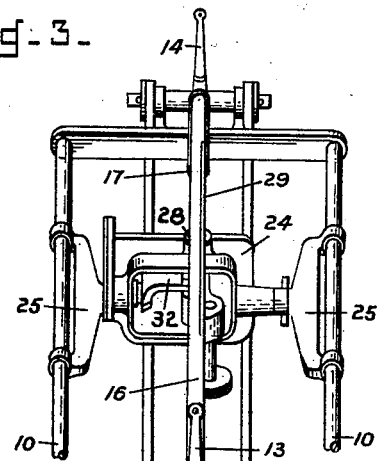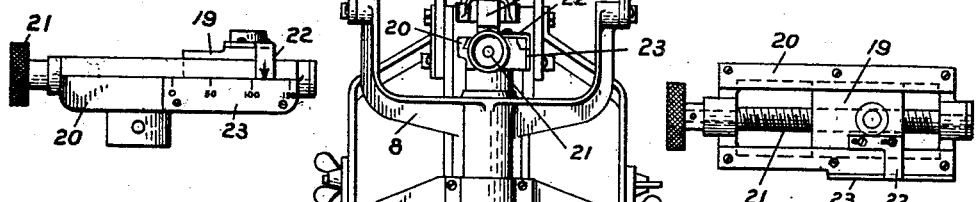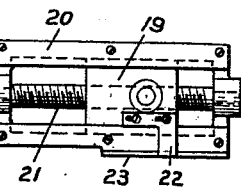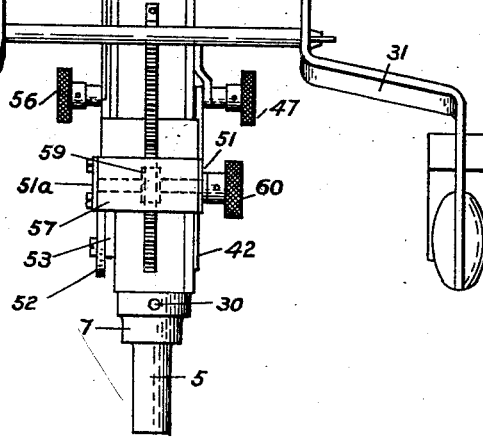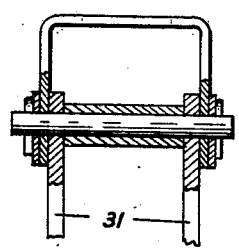

1,735,028

UNITED STATES PATENT OFFICE

WILLIAM P. WILSON, OF DETROIT, MICHIGAN

DATA COMPUTER

Application filed August 22, 1927. Serial No. 214,700.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

The subject of this invention is a data computer especially designed for small caliber weapons.

In establishing a defense against aircraft with the lighter more mobile weapons such as the machine gun and the automatic 37 m/m gun a fire control apparatus should be used which is of a centralized, self contained character, commensurate in weight and possessing the mobility of the weapon which it must accompany and which requires a minimum of personnel and is capable of being brought into operation in the shortest possible time.

The apparatus forming the subject of this invention is characterized principally by a mechanical arrangement whereby the values of engine speed, slant range, and angle of approach of a target are introduced to displace a sight base to afford measures of lateral and vertical lead angles to be applied to the gun. The apparatus also incorporates mechanism for employing the vertical lead angle in determining the angle of superelevation and for combining it with the vertical lead angle.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in left side elevation of the apparatus;

Fig. 2 is a view in right side elevation;

Fig. 3 is a rear view;

Fig. 4 is a sectional view on the line 4—4 of Fig. 2;

Fig. 5 is a sectional view on the line 5—5 of Fig. 1;

Fig. 6 is a sectional view on the line 6—6 of Fig. 1;

Fig. 7 is a sectional view on the line 7—7 of Fig. 6;

Fig. 8 is a detail plan view of a gear segment;

Fig. 9 is a sectional view on the line 9—9 of Fig. 1;

Fig. 10 is a sectional view on the line 10—10 of Fig. 1;

Fig. 11 is a sectional view on the line 11—11 of Fig. 1;

Fig. 12 is a sectional view on the line 12—12 of Fig. 2;

Fig. 13 is a sectional view on the line 13—13 of Fig. 2;

Fig. 14 is a view in side elevation of the speed scale guide and slide;

Fig. 15 is a plan view of the same; and

Fig. 16 is a sectional view on the line 16—16 of Fig. 1.

Referring to the drawings by numerals of reference:

One practical embodiment of the invention consists of a spindle 5 vertically and rotatably mounted in a support 6 which is herein shown as a tripod. A collar 7, near the lower extremity of the spindle, serves to support a yoke 8 whose stem is hollow and incloses the spindle. The yoke, in turn, carries a parallelogram frame 9 the upper tubular rails 10 of which are pivoted to the arms of the yoke and have greater spacing than the lower arms 11, which are pivoted to the stem adjacent its lower end, in order that they may accommodate sight base 12. The sight base, carrying the rear sight 13 and the front sight 14, consists of a lower rack bar 15 and an upper scale bar 16 secured in parallel relationship by means of end brackets 17.

The sight base is supported, at the rear, by a universal coupling 18 (see Figs. 3 and 9) mounted on a slide 19 (Figs. 14 and 15) which is carried by a guide 20 secured to the upper extremity of the spindle 5. The slide is displaced by means of a worm 21 and carries an index 22 for registering against a speed scale 23 fixed to the guide. Displacement of the slide according to the speed of the target will therefore cause vertical and, incidentally, longitudinal displacement of the sight base. The sight base is supported forwardly by a universal joint (Fig. 5) whose cradle 24 carries horizontal axes which are trunnioned in guides 25 slidable on the rails 10 of the frame. A vertically mounted bearing block 26, positioned within the cradle, supplies the engagement with the rack bar 15 of the sight base and carries a shaft and pinion 27 (Fig. 10) whereby the cradle may be longitudinally displaced. The amount of displacement is read by an index 28 on the cradle which registers against a range scale 29 fixed to the scale bar 16 of the sight base. The amount of displacement of the sight base in the horizontal and vertical planes, which results from the displacement of the cradle, will depend on the position of the rear attachment of the base.

The spindle 5 may be rotated by means of the rod 30, which, in the operation of the device, is set parallel to the direction of flight or angle of approach of the target. Rotation of the spindle and with it the guide 20 causes lateral and vertical displacement of the sight base and the amount is dependent on the position of the universal coupling 18 with respect to the axis of rotation. Thus, if the coupling be set at zero on the speed scale 23 it will be coincident with the axis of rotation of the spindle and the sight base will not be laterally or vertically displaced. This condition corresponds to sighting on a stationary target.

By virtue therefore of the parallelogram frame, which is controlled by means of the actuating linkage 31, a condition of zero setting of the sight base is maintained at all times during tracking of a target and this condition corresponds to the laying of the gun which at all times is to be trained on the target.

The frame therefore supplies a basis for measuring the deviations of the sight base caused by having it conform to the conditions of flight of the target as applied in terms of speed, range and angle of approach.

Referring more particularly to Fig. 5; there is fixed to the vertical pivot of the block 26 of the forward universal joint a segmental gear 32, which meshes with a pinion 33 fast on one end of a shaft 34 journaled in the left side of the cradle and carrying on its other end a pointer 35 adapted to register against a lateral correction scale 36 on the side of the cradle.

Secured to the cradle adjacent the right hand trunnion, is a segmental gear 37 which meshes with a pinion 38 fast on one end of a shaft 39 journaled in the right side plate of the cradle and carrying on its other end a pointer 40 adapted to register against a vertical correction scale 41 on the right side of the cradle.

Carried by the lower right hand arm 11 of the frame is an arm 42 adapted to rotate about the pivoted attachment of said arm and inscribed with a range scale. On its free end the arm 42 carries a gear segment 43 bearing a vertical lead scale 44 corresponding to the scale 41. A bracket 45 on the arm 11 carries an index 46 for reading the sacle 44 and mounts a pinion and shaft 47 for displacing the segment 43 with respect to the arm 11 an amount corresponding to the vertical lead angle.

At the left side of the frame, and pivoted to oscillate about the same axis as the arm 11, is an arm 49, carrying a vertical sight setting scale 48 which is interconnected with the segment 43 by means of a stud 50 so that the arm and scale will partake of the movement of the segment.

Mounted on the stem of the yoke to move vertically thereon, is a carriage 57 in which is journaled a shaft 58 having mounted thereon a pinion 59 meshing with a rack formed on the stem, and rotatable through means of a thumb wheel 60 secured to the protruding end of the shaft. The carriage has mounted on the respective ends thereof the indices 51 and 51$^a$, preferably each in the form of a rectangular frame across which a wire is stretched. The wire on the frame 51 reads against the range scale 42, while the wire on the frame 51$^a$ crosses a wire stretched on a frame 52, which is secured to and partakes of the movement of the left hand arm 11 of the frame. The wires of the indices 51$^a$ and 52 read against a scale 53 which is secured to the left side of the yoke stem and has engraved thereon a family of curves of constant superelevation plotted with angle of sight as abcissæ and slant range as ordinates. The provision of the vertically movable carriage 57 carrying the indices 51 and 51$^a$ provides for conversion of a range function into a height function and is made as a mechanical expedient and also to avoid the employment of an additional instrument for supplying the height function of the target.

An index member 54 is mounted for sliding movement between the sight setting scale 48 and a super-elevation scale 55 carried by the left hand frame 11. The member has, journaled therein, a shaft carrying a pinion 56 which meshes with a segmental rack carried by the arm 11. The shaft and pinion may be manipulated through a usual thumb wheel as shown.

The operation of the device is as follows: The sight frame is set with the vertical axis of the rear universal joint in alignment with the axis of the spindle 5, which is zero setting, and which will bring the rack bar 15 into parallelism with the frame bars 10. The device is then manipulated through the handle bars 31 to pick an approaching aircraft or other target through the sights.

As soon as the angle of approach of the target is determined the spindle is given a partial rotation through means of the bar 30 to cause the bar 30, and consequently the axis of the guide 20, to be in the plane of approach. The determined speed of the plane is set off on the speed scale 23, thereby moving the sight frame from zero position and consequently changing the elevation of the sights and also, when the plane is not approaching head on, their position in azimuth.

The announced range is set off on the range scale 29 by manipulating the thumb wheel to rotate the pinion 27, which, by reason of its engagement with the rack of rack bar 15, will cause the cradle to move longitudinally of the frame bars 10, thereby causing further displacement of the sights.

This displacement of the sights, together with the consequent movement of the frame by the sighting operator in bringing his sights back on the target, will cause movement of the block 29 and with it the segmental gear 32, thereby rotating pinion 33, with its shaft 34, causing pointer 35 to indicate against scale 36 the lateral correction, the value of which is announced to the gunners.

The beforementioned movements likewise cause the cradle to rock on its trunnions, thereby rocking the gear 37, which, through pinion 38 and shaft 39 will move pointer 40 to register against scale 41 the amount of vertical lead angle, the values of which must be algebraically added to the angle of superelevation, which is the vertical angle between the axis of bore of the gun and the plane of sight and is designed to cause the trajectory of the bullet to pass through the point at which the line of sight is directed.

The vertical lead angle as indicated by the pointer 40 on the scale 41 is set off on the scale 44 by manipulation of the pinion 47 through its thumb wheel. This movement of the scale 44 imparts a corresponding movement to the sight setting scale 48 with which it is connected.

The carriage 57 is moved along the yoke stem until the wire of the frame 51 coincides with the announced range on the scale 42, thereby moving the frame 51ᵃ, changing the point of intersection of its wire with the wire of frame 52, and this point may be read against scale 53, giving superelevation.

The double index 54 is then moved to the proper point on the superelevation scale 55 and the index read against the sight setting scale to secure the true setting of the gun in elevation.

I claim:

1. A computing apparatus embodying a parallelogram frame, a spindle rotatable within the fixed link of the frame, a direction rod on the spindle, a guide on the spindle parallel to the rod, universal coupling members slidable on the frame and on the guide, a sight base supported by the universal coupling members, means for displacing the frame coupling an amount corresponding to the range, means for displacing the guide coupling an amount corresponding to speed, means associated with the frame coupling for indicating the amount of lateral and vertical displacement of the sight base with respect to the frame, means associated with the frame for determining the angle of superelevation and means for combining the angle of superelevation and the vertical displacement angle of the sight base.

2. A computing apparatus embodying a parallelogram frame, a spindle rotatable within the fixed link of the frame, a direction rod on the spindle, a guide on the spindle parallel to the rod, universal coupling members slidable on the frame and on the guide, a sight base supported by the universal coupling members, means for displacing the frame coupling an amount corresponding to range, means for displacing the guide coupling an amount corresponding to speed, means associated with the frame coupling for indicating the amount of lateral and vertical displacement of the sight base with respect to the frame and means associated with the frame for determining the angle of super-elevation.

3. A computing apparatus embodying a parallelogram frame, a spindle rotatable within the fixed link of the frame, a direction rod on the spindle, a guide on the spindle parallel to the rod, universal coupling members slidable on the frame and on the guide, a sight base supported by the universal coupling members, means for displacing the frame coupling an amount corresponding to range, means for displacing the guide coupling an amount corresponding to speed, and means associated with the frame coupling for indicating the amount of lateral and vertical displacement of the sight base with respect to the frame.

4. A computing apparatus embodying a pivoted frame, a vertical spindle intersecting the pivotal axis of the frame and mounted for rotational movement, a direction rod on the spindle, a guide on the spindle parallel to the rod, a sight base flexibly suspended by the frame and guide, means for displacing the forward suspension of said base an amount corresponding to range, means for displacing the rear suspension an amount corresponding to speed and means for indicating the amount of lateral and vertical displacement of the sight base with respect to the frame.

5. A computing apparatus embodying a pivoted frame, a rotatable spindle in the pivotal axis of the frame, a respective slidable universal coupling on the frame and on the spindle, a sight base supported by the couplings, and means associated with the frame coupling for indicating the lateral and vertical displacement of the sight base with respect to the frame.

6. A computing apparatus embodying supporting members rotatable in planes perpendicular to each other, a sight base flexibly suspended by said members, means for effecting lateral and vertical displacement of the sight base, according to functions of angle of approach, speed and range and means for indicating the amount of displacement with respect to one of the supporting members.

7. A computing apparatus embodying supporting members, a sight base flexibly suspended by said members, means for effecting lateral and vertical displacement of the sight base according to functions of angle of approach, speed and range and means for indicating the amount of displacement with respect to one of the supporting members.

8. A computing apparatus embodying supporting members, a sight base flexibly suspended by said members, means for effecting lateral and vertical displacement of said base according to positional functions of a target and means for measuring the amount of displacement with respect to one of the supporting members.

9. A computing apparatus embodying a pivoted member movable proportionate to angle of site, a range arm angularly displaceable with respect to the site member an amount proportionate to vertical lead angle, a sight setting scale movable with said arm, vertically movable indices intersecting the range arm and site member, a plate having a chart of curves of constant superelevation fixed to the support and read at the intersection of one index and the site member, a superelevation scale fixed to the angle of site member and a slidable index between the superelevation and sight setting scales.

10. A computing apparatus embodying a pivoted member movable proportionate to angle of site, a range arm angularly displaceable with respect to the site member an amount proportionate to vertical lead angle, a sight setting scale movable with said arm, vertically movable indices intersecting the range arm and site member, a plate having a chart of curves of constant superelevation fixed to the support and read at the intersection of one index and the site member, and means for entering the angle of superelevation in the reading to be taken from the sight setting scale.

11. A computing apparatus embodying a pivoted member movable proportionate to angle of site, a range arm angularly displaceable with respect to the sight member an amount proportionate to vertical lead angle, vertically movable indices intersecting the range arm and site member, a plate having a chart of curves of constant superelevation fixed to the support and read at the intersection of one index and the site member and means for combining the angle of superelevation and the vertical lead angle.

12. A computing apparatus embodying a support, a plate bearing a chart of curves of constant superelevation fixed to the support, an angle of site member and vertical lead angle member bearing a scale of ranges pivoted to the support and means on the support for converting a range function into a height function.

13. A computing apparatus embodying supporting members, a sight base carried thereby and displaceable according to positional functions of a target to indicate lateral and vertical lead angles, means associated with one of the supports for determining the angle of superelevation corresponding to the vertical displacement of the sight base and means for combining the angle of superelevation and the vertical lead angle.

14. A computing apparatus embodying supporting members, a sight base carried thereby and displaceable according to positional functions of a target to indicate lateral and vertical lead angles, and means associated with one of the supports for determining the angle of superelevation corresponding to the vertical displacement of the sight base.

WILLIAM P. WILSON.